United States Patent [19]
Forsythe

[11] Patent Number: 6,085,786
[45] Date of Patent: Jul. 11, 2000

[54] CYCLIC FLOW VALVE

[75] Inventor: Alan K. Forsythe, Vashon, Wash.

[73] Assignee: GT Development Corporation, Tukwila, Wash.

[21] Appl. No.: 09/067,924

[22] Filed: Apr. 28, 1998

[51] Int. Cl.[7] .................................................. F16K 5/14
[52] U.S. Cl. .............................. 137/624.13; 137/625.31; 251/120; 251/121
[58] Field of Search ..................... 137/624.13, 625.31; 251/120, 121; 34/191

[56] References Cited

U.S. PATENT DOCUMENTS

| | | | |
|---|---|---|---|
| 2,367,319 | 1/1945 | Wahlberg | 137/625.31 X |
| 2,515,644 | 3/1947 | Goddard . | |
| 2,869,526 | 1/1959 | Dolza | 137/625.31 X |
| 3,098,960 | 7/1963 | Huska | 137/624.13 X |
| 3,332,236 | 7/1967 | Kunsagi . | |
| 3,372,709 | 3/1968 | Dolter | 137/625.31 |
| 3,395,967 | 8/1968 | Karr . | |
| 3,584,849 | 6/1971 | Cremer . | |
| 3,586,468 | 6/1971 | Sims . | |
| 3,837,788 | 9/1974 | Craig et al. . | |
| 4,297,093 | 10/1981 | Morimoto et al. . | |
| 4,328,831 | 5/1982 | Wolff . | |
| 4,347,052 | 8/1982 | Reed et al. . | |
| 4,697,358 | 10/1987 | Kitchen . | |
| 4,708,159 | 11/1987 | Lockwood, Jr. . | |
| 4,846,665 | 7/1989 | Abbasi . | |
| 5,143,121 | 9/1992 | Steinhardt et al. . | |
| 5,181,580 | 1/1993 | Burg . | |
| 5,205,227 | 4/1993 | Khinkis et al. . | |
| 5,209,187 | 5/1993 | Khinkis . | |
| 5,302,111 | 4/1994 | Jouvaud et al. . | |
| 5,402,821 | 4/1995 | Harstad | 137/625.31 X |
| 5,456,594 | 10/1995 | Yap . | |

FOREIGN PATENT DOCUMENTS

| | | |
|---|---|---|
| 2 520 056 | of 1983 | France . |
| 38 22 793 A1 | 1/1990 | Germany . |
| 196 06 269 A1 | 8/1997 | Germany . |

*Primary Examiner*—Kevin Lee
*Attorney, Agent, or Firm*—Christensen O'Connor Johnson & Kindness PLLC

[57] ABSTRACT

A cyclic flow valve (20) for cyclically controlling the flow of combustants into a combustion furnace. The cyclic flow valve includes a valve housing (26) having a chamber (30), an inlet (36), and an outlet (46). The cyclic flow valve also includes an aperture plate (52) rigidly fixed within the chamber of the valve housing. The aperture plate has first and second apertures (68a and 68b) extending through the plate. A rotor member (54) is rotatably secured within the chamber. The rotor member is held in spaced disposition from the aperture plate. The space defines a low flow gap (92) of predetermined width between the rotor member (54) and the aperture plate (52). The rotor has diametrically opposed paddles (70s and 70b) positioned and sized to selectively control the flow of combustants through the flow valve between a low flow position, wherein the combustants flow through the low flow gap at a predetermined minimal flow rate, and a high flow position, wherein the combustants flow between the inlet and outlet at a predetermined maximum flow rate. In the low flow position, the paddles (70a and 70b) obstruct flow through apertures (68a and 68b) in the aperture plate (52). In the high flow position, the paddles do not obstruct flow through the apertures. The cyclic flow valve includes a rotary motor (50) for rotating the rotor member (54) within the chamber between the low flow position and high flow position.

27 Claims, 6 Drawing Sheets

CYCLIC FLOW VALVE

FIELD OF THE INVENTION

The present invention relates generally to rotary valves and, more particularly, to cycling flow valves for oscillating combustion furnaces.

BACKGROUND OF THE INVENTION

Combustion is the rapid reaction of a fuel with oxygen. For economic reasons, air is the source of oxygen in most combustion reactors. The molecular composition of air includes nitrogen, oxygen, argon, and carbon dioxide, and primarily oxygen and nitrogen. Most fuels used in combustion furnaces, such as power plants, are either coal, fuel oil, or gaseous fuels. Such fuels contain carbon and hydrogen elements in their molecular structure. When a fuel is burned, the carbon in the fuel reacts with oxygen to form either $CO_2$ or CO, and the hydrogen in the fuel reacts with oxygen to form $H_2O$. However, at higher temperatures at least a portion of the nitrogen in air reacts to form certain levels of nitrogen oxide ($NO_x$). Such oxides of nitrogen constitute a major source of air pollution.

Air pollution, while not necessarily lethal, is damaging to human and animal tissue, such as lung tissue. Consequently, multiple limitations on the $NO_x$ content of stack gases vented to the atmosphere as a result of fuel burning have been or are likely to be imposed by various governmental authorities and agencies. One method of reducing the emissions of $NO_x$ includes an oscillating combustion furnace.

Oscillating combustion is the forced oscillation of combustants, such as fuel and/or oxygen, supplied to a burner to create successive fuel rich and fuel lean zones within the combustion chamber of a burner, as taught by U.S. Pat. No. 4,846,665, issued to Abbasi. By oscillating the combustion between fuel rich and fuel lean zones, the fuel burn within the furnace approaches, on average, near stoichiometric, or molecularly complete, burning conditions. However, by oscillating the combustion, the high temperature of stoichiometric burning is avoided, thereby minimizing emissions of $NO_x$.

In the past, oscillation of the combustants into the combustion chamber has been regulated by a variety of control valves. Such valves regulate the flow rate of the combustibles into the combustion chamber, such that the mass flow rate of the reactants is at a full flow level for a predetermined amount of time and then rapidly ramps down to a low flow mass flow rate. The low flow mass flow rate through the control valve is maintained for a predetermined period until the valve is opened, thereby causing the mass flow to ramp up to the full flow position. Rapidity of ramp down and ramp up is significant to $NO_x$ reduction. Thus, by oscillating the combustants into a combustion chamber of a oscillating combustion furnace, the combustion therein approaches the near stoichiometric proportions and, therefore, delivers the full heating capability, while at the same time minimizing the emissions of airborne pollutants.

Control valves currently available for oscillating burners include mechanical and piezoelectric valves. Poppet type mechanical valves are limited in durability, as well as ability to vary flow between two levels with very small response time. Piezoelectric valves can respond quickly and vary flow between two values, but may also be limited in durability at high temperatures associated with furnaces, due to their use of a flexing elastomeric valve element. Piezoelectric valves have a valve housing, an inlet, an outlet, a piezoelectric actuator assembly, and an elastomeric valve element. The piezoelectric actuator assembly and plunger are disposed within the valve housing, such that the mass flow from the inlet through the valve and out the outlet may be controlled by actuating the piezoelectric oscillating assembly. The piezoelectric oscillating assembly reciprocates the plunger therein to selectively open and close the valve, thereby oscillating flow therethrough. As is well-known, piezoelectric materials may either react to a mechanical stress by producing an electrical charge, or react to an electrical charge by producing a mechanical strain. Current piezoelectric oscillating control valves actuate the piezoelectric oscillating assembly by an electrical charge to produce the desired oscillation of fuel flow into the combustion chamber. However, the useful life of the valve may be shortened because of the adverse effects of the operating temperatures of the furnace on the elastomeric valve element. Therefore, although piezoelectric oscillating assemblies are effective at providing pulse flow into the combustion chamber of a burner, they tend to be sensitive to higher temperatures.

Another form of mechanical oscillating valves utilizes a pair of coaxially aligned aperture plates. The aperture plates are rotatably synchronized with each other to pulse the flow of combustants into the combustion chamber. The aperture plates of such valves have a plurality of holes drilled through each plate. As each plate is rotated, usually in opposite directions of each other, combustants flow through the valve only when the apertures of one plate align with the apertures of the second plate because only at alignment does a passage exist through the valve. Such valves are usually fairly complex because they require more complex mechanical mechanisms to rotate two plates relative to each other.

Thus, there exists a need for a relatively simple and inexpensive control valve for an oscillating combustion furnace that provides controlled flow of combustants into the combustion chamber to minimize the production of $NO_x$ gases. The present invention is directed to fulfilling this need.

SUMMARY OF THE INVENTION

In accordance with the present invention, a cyclic flow valve for use in a pulse combustion burner is provided. The cyclic flow valve includes a valve housing having a chamber, an inlet, and an outlet. An aperture plate is rigidly fixed within the chamber of the valve housing. The aperture plate includes apertures extend through the plate. The cyclic flow valve also includes a rotor member rotatably secured within the chamber. The rotor member is held in spaced parallel disposition from the aperture plate to define a low flow gap of predetermined width therebetween. The rotor member has different radial segments sized to selectively control the flow of combustants through the apertures between a low flow position, wherein the combustants flow through the low flow gap at a predetermined minimum flow rate, and a high flow position, wherein the combustants flow between the inlet and outlet at a predetermined maximum flow rate. The cyclic flow valve has a rotary drive member for rotating the rotor member within the chamber between the low flow position and the high flow position.

In accordance with other aspects of this invention, the aperture plate includes first and second apertures. Preferably, the first and second apertures are diametrically opposed with respect to the axis of rotation of the rotor member.

In accordance with additional aspects of this invention, the rotor member is a plate having first and second paddles spaced about a circular center section. The first and second paddles project radially from opposite ends of the center section, such that as the rotor plate is rotated by the rotary drive member, the paddles alternate the cyclic flow valve between the high and low flow positions by simultaneously obstructing the flow through the first and second apertures of the aperture plate and then simultaneously unobstructing the flow through the first and second apertures.

In accordance with other aspects of this invention, the rotary drive member is a variable speed motor. The speed of the motor is adjustable to selectively increase or decrease the amount of time the cyclic flow valve is in either the high or low flow positions.

In accordance with yet other aspects of this invention, the size of the low flow gap controls the minimum flow rate of combustants through the cyclic flow valve when the valve is in the low flow position.

A cyclic flow valve formed in accordance with the present invention has several advantages over control valves used in the past in combustion burners. First, because a mechanical rotor plate and its bearings are not affected by the high temperatures of the combustion burner. Therefore, a valve constructed in accordance with the present invention is cheaper, more durable, and more reliable. Second, the operator of the furnace can optimize the pulse frequency of the combustants by selectively increasing or decreasing the speed of the variable speed drive motor. Therefore, a valve formed in accordance with the invention is more robust than those currently available. In summary, a cyclic flow valve for combustion burners formed in accordance with the present invention is cheaper to produce and operate, more reliable, and more robust than currently available control valves.

BRIEF DESCRIPTION OF THE DRAWINGS

The foregoing aspects and many of the attendant advantages of this invention will become understood by reference to the following detailed description, when taken in conjunction with the accompanying drawings, wherein.

DETAILED DESCRIPTION OF THE PREFERRED EMBODIMENT

Figure 1:
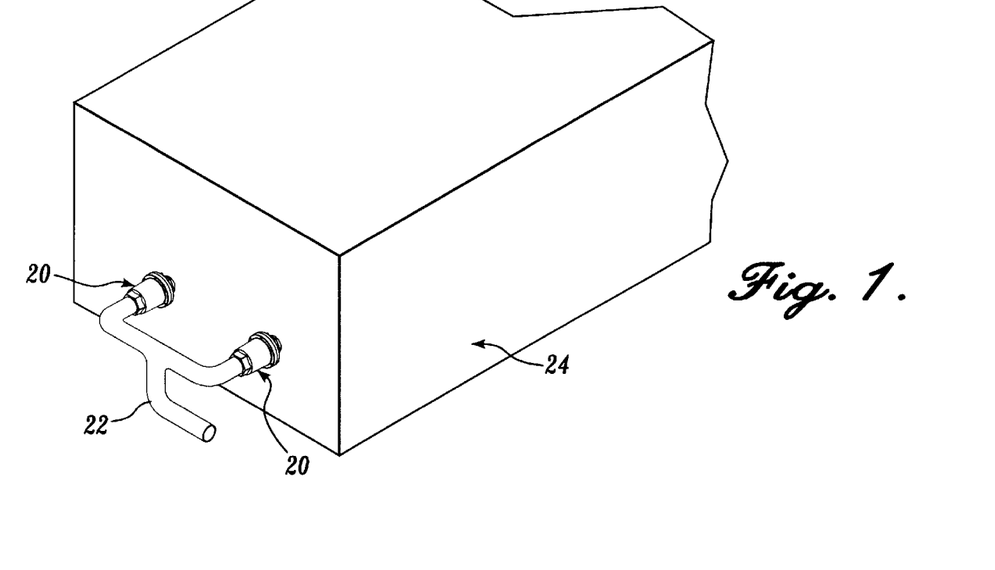
FIG. 1 is an environmental view of a cyclic control valve constructed in accordance with the present invention as it would be used in a pulse combustion furnace.

FIG. 1 illustrates a preferred embodiment of a cyclic control valve 20 constructed in accordance with the present invention mounted to the combustion chamber 24 of an oscillating combustion furnace (not shown). The valve 20 is shown mounted between a gas supply line 22 and the combustion chamber 24. The combustion chamber 24 is of the type commonly used in combustion furnaces such as boilers for power plants, steel plants or furnaces for glass producing plants. As seen in FIG. 1, two valves 20 are shown coupled to the fuel supply line 22. The two valves 20 maintain a near constant pressure within the fuel supply line 22. In such an arrangement, the valves 20 are coupled to the fuel supply line 22 by a T-joint. The valves are synchronized with each other, such that when one valve is in the low flow position, the other valve is in the high flow position, thereby maintaining the pressure within the fuel supply line 22 at a substantially constant level because only one valve is in the high flow position at any time. The use of two valves 20, as shown in FIG. 1, is intended for illustrative purposes only and is not intended to limit use of a valve 20 formed in accordance with the present invention.

Figure 2:
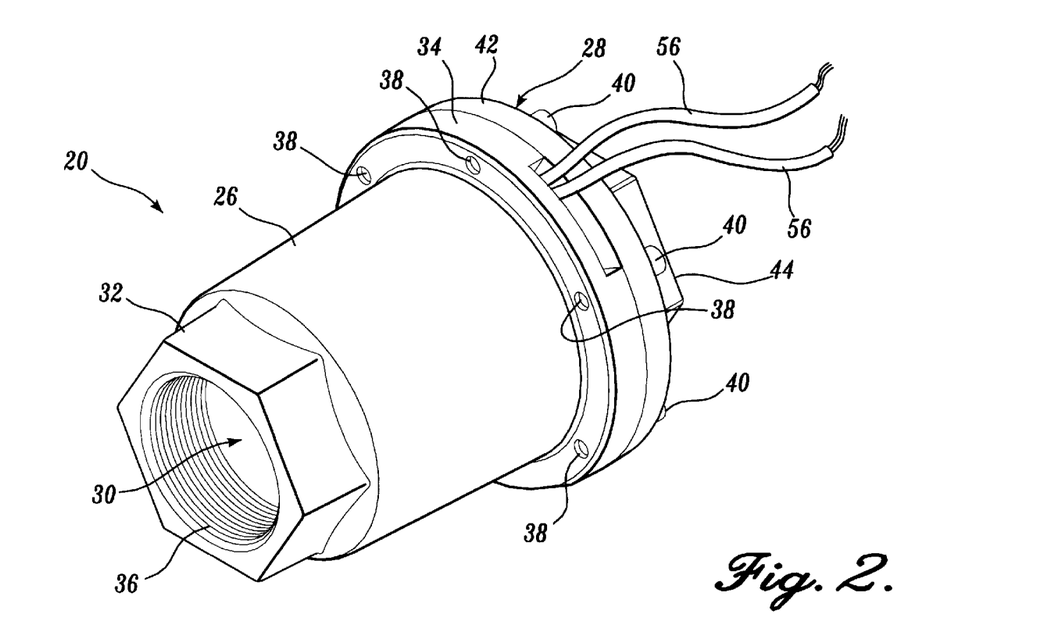
FIG. 2 is a perspective view of a cyclic flow valve formed in accordance with the present invention.
Figure 3:
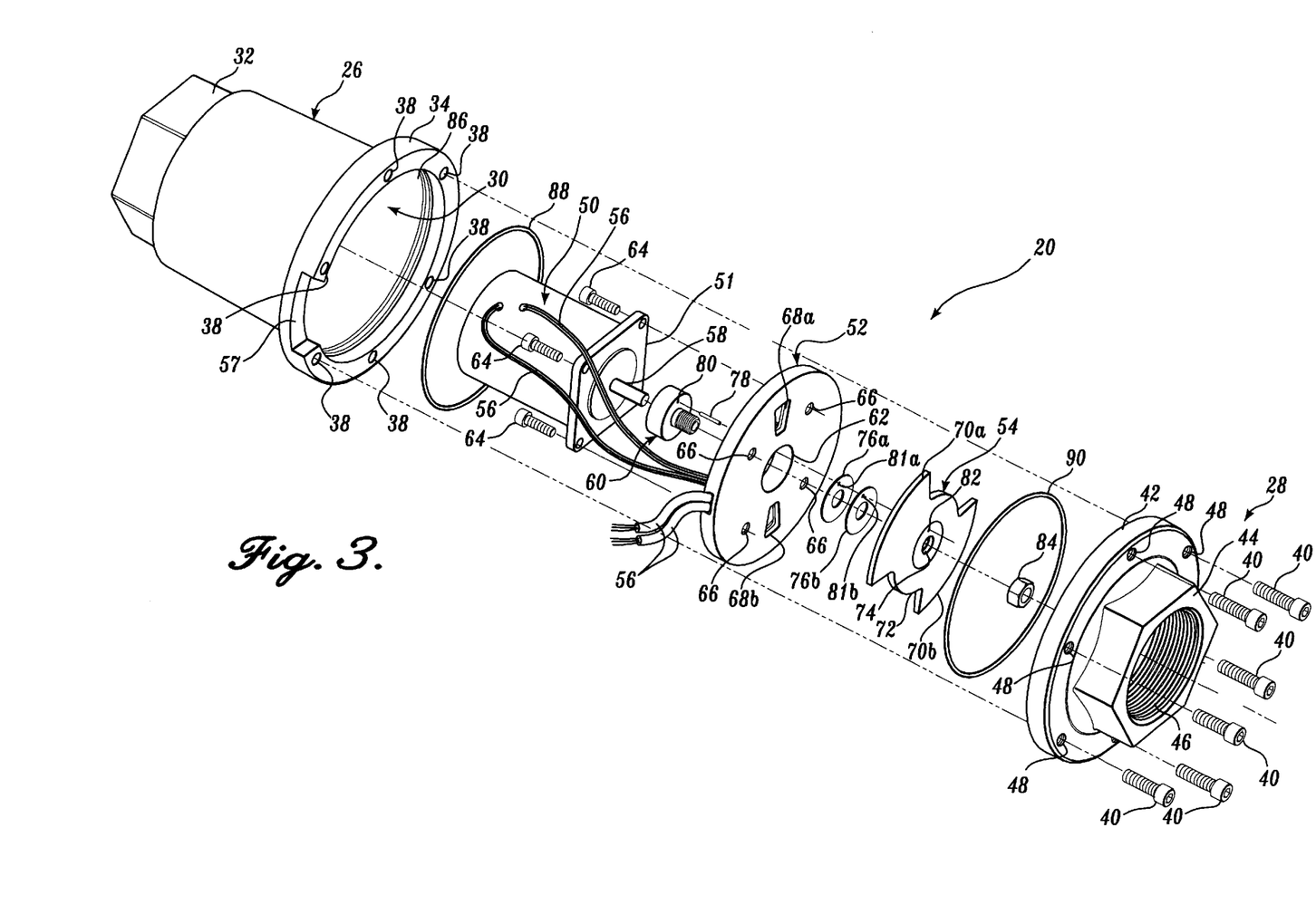
FIG. 3 is an exploded view of a cyclic flow valve formed in accordance with the present invention showing the major elements of the cyclic flow valve.

Referring to FIGS. 2 and 3, the valve 20 will be described in greater detail. The valve 20, the major components of which are preferably manufactured from a high strength material, such as aluminum, includes a valve housing 26 and an exit manifold 28. The valve housing 26 is substantially cylindrical in configuration and has a hollowed-out center portion defining an internal flow chamber 30 extending therethrough. The valve housing 26 includes a fuel supply inlet joint 32 integrally formed with one end thereof and an annular mating flange 34 integrally formed with an opposite end thereof.

The fuel supply inlet joint 32 has an outside perimeter that is hexagonal in configuration and an internally threaded central portion 36 extending therethrough. The inlet joint 32 and threaded portion 36 thereof are sized to threadably and sealingly receive an end of the fuel supply line 22, thereby placing the fuel supply line 22 into fluid communication with the internal flow chamber 30.

The mating flange 34 projects radially outward from the outside perimeter of the valve housing 26, such that the mating flange 34 defines a rim around the perimeter of one end of the valve housing 26. The flange 34 has a plurality of radially located, internally threaded attachment holes 38 extending normally through the flange. The attachment holes 38 are spaced about the flange 34 and are sized to receive well-known fasteners 40, such as socket head cap screws. The cap screws fasten the exit manifold 28 to the outboard facing surface of the flange 34, as is described in greater detail below.

As may be seen better by referring to FIG. 3, the exit manifold 28 has an annular base portion 42 and a fuel supply outlet joint 44. The fuel supply outlet joint 44 has a hexagonal outside perimeter and an internally threaded central portion 46 extending therethrough. The threaded portion 46 is sized to threadably and sealingly receive a fuel supply nozzle (not shown) attached to the combustion chamber 24, thereby placing the valve 20 into fluid communication with the combustion chamber 24 of the furnace.

The base portion 42 of the exit manifold 28 is circular in configuration and has a diameter that is substantially equal to the diameter of the flange 34 of the valve housing 26. The base portion 42 has a plurality of attachment holes 48 extending through the perimeter of the base portion 42. The attachment holes 48 on the base portion 42 correspond in number and location to the attachment holes 38 of the flange 34. As a result, when the fasteners 40 are threadably received within the corresponding attachment holes, the exit manifold 38 is fastened to the valve housing 26.

Still referring to FIG. 3, the valve 20 also includes a motor 50, an aperture plate 52, and a rotor 54. The motor 50 is preferably a variable speed motor, such as a DC or stepper motor. The housing of the motor 50 is sized to be received within the internal flow chamber 30 of the valve housing 26. The motor 50 includes a base 51 that is square in configuration and integrally formed with the motor housing. Power is supplied to the motor 50 by an external power source (not shown) through the power supply cables 56. The power supply cables 56 are operatively attached to the motor 50. In the preferred embodiment of FIG. 3, the power supply cables 56 extend from the motor housing into a wiring channel located in the aperture plate 52. The wiring channel extends from the upper surface of the aperture plate 52, partially through the thickness, and exits out the edge of the aperture plate. The power supply cables 56 pass through the wiring channel and are sealed therein by a sealant. When the motor 50 is attached within the valve housing 26, as is described in greater detail below, the power supply cables 56 extend out through a notch 57 defined in the flange 34 of the valve housing 26. Extending outwardly from one end of the motor 50 is a rotary shaft 58. The rotary shaft 58 projects outwardly from the base 51 and the free end of the rotary shaft 58 includes a sleeve 60 operatively fastened thereto.

The sleeve 60 is substantially T-shaped in configuration and includes a centrally located bore (not shown) extending longitudinally through both the transverse and stem portions thereof. The centrally located bore of the sleeve 60 is sized to receive the rotary shaft 58, such that the sleeve 60 may be fastened to the shaft 58 by press fitting the sleeve 60 thereto. Because the sleeve is fastened to the rotary shaft 58, the sleeve 60 will rotate at the same angular velocity as the shaft 58. The sleeve 60 is sized to pass freely through a centrally located bore 62 extending through the thickness of the aperture plate 52.

The aperture plate is adapted to be rigidly fastened to the housing of the motor 50 by a plurality of well-known fasteners 64, such as socket head cap screws, extending through the base plate 51 of the housing of the motor 50 and into corresponding attachment holes 66 extending through the aperture plate 52. The aperture plate 52 is circular in shape and is preferably manufactured from a high strength material, such as aluminum. The aperture plate 52 includes identically configured first and second flow passages 68a and 68b that extend through the plate.

The first and second flow passages 68a and 68b are diametrically opposed and lie on opposite sides of the center of the circularly shaped aperture plate 52. The flow passages 68a and 68b are positioned radially outwardly from the center of the aperture plate 52. Preferably, the flow passages 68a and 68b have an arcuate shape. Although the preferred number of flow passages extending through the aperture plate is two, aperture plates with one or more than two flow passages are within the scope of the invention.

Still referring to FIG. 3, attention is now directed to the rotor 54. The rotor 54 is preferably manufactured from a high strength material, such as aluminum, and includes first and second arcuately shaped paddles 70a and 70b. The paddles 70a and 70b are diametrically opposed to one another and project radially outwardly from a circular central section 72. The free ends of the paddles 70a and 70b have a predetermined radius of curvature. The first and second paddles 70a and 70b are integrally formed with the central section 72. Centrally located in the central section 72 is an attachment hole 74 that extends through the central section 72. The attachment hole 74 is sized to receive the threaded stem of the sleeve 60 so as to rotatably couple the rotor 54 to the motor 50.

The rotor 54 is coupled to the motor 50 by the sleeve 60, with the aperture plate 52 disposed therebetween. When assembled, one side of the aperture plate 52 is flushly mounted against the base 51 of the motor 50, such that the sleeve 60 extends through the bore 62 of the aperture plate 52. The aperture plate 52 is fastened to the motor 50 by a plurality of fasteners 64 extending through the base 51 of the motor 50. The fasteners 64 are threadably received within the attachment holes 66 of the aperture plate 52. As assembled, the threaded stem portion of the sleeve 60 projects outwardly through the bore 62 of the aperture plate 52, such that the outwardly facing surface of the transverse portion of the sleeve 60 is flush with the surface of the aperture plate 52 that is adjacent the rotor 54.

The flow valve 20 also includes first and second spacer washers 76a and 76b disposed between the sleeve 60 and the rotor 54. The first and second spacer washers 76a and 76b include a centrally located hole extending therethrough. The centrally located hole of the washers 76a and 76b are sized to slideably receive the threaded portion stem of the sleeve 60. The first and second spacer washers 76a and 76b have an outside diameter substantially equal to the diameter of the transverse portion of the sleeve 60. When received on the sleeve 60, the washers 76a and 76b space the rotor 54 from the aperture plate 52, as is described in greater detail below.

The rotor 54 is fastened to the sleeve 60 by a dowel 78. The dowel 78 extends between a first lock bore 80 located in the sleeve 60 and a second lock bore 82 located in the rotor 54 and through lock bores 81a and 81b located in the first and second spacer washers 76a and 76b, respectively. The first lock bore 80 extends at least partially through the width of the transverse portion of the sleeve 60 and the second lock bore 82 extends through the thickness of the rotor 54. The dowel 78 couples the rotor 54 and the spacer washers 76a and 76b to the rotary shaft 58 such that the rotor 54 and the rotary spacer washers 76a and 76b rotate with the rotary shaft 58 of the motor 50.

The rotor 54 is fastened to the motor 50 by a well-known fastener 84, such as a nut, being threadably received on the threaded portion of the sleeve 60. The rotor 54 is rotatably coupled to the motor 50, such that the aperture plate 52 is disposed therebetween. Furthermore, the rotor 54 is disposed adjacent the aperture plate 52, such that the paddles 70a and 70b of the rotor 54 pass over the flow passages 68a and 68b of the aperture plate 52 to alternately obstruct and unobstruct fuel passage therethrough, as is described in greater detail below.

As assembled, the motor 50, aperture plate 52, and rotor 54 are slidably received within the internal flow chamber 30 of the valve housing 26, such that the perimeter of the aperture plate 52 is seated therein on an annular shoulder 86. A first O-ring 88 is seated between the shoulder 86 and the aperture plate 52 to define a seal therebetween. As described above, the exit manifold 28 is fastened to the valve housing 26 by a plurality of fasteners 40 extending through the exit manifold 28 and into the flange 34 of the valve housing 26. A second O-ring 90 is disposed between the exit manifold 28 and the aperture plate 52 to define a seal therebetween.

Figure 4:
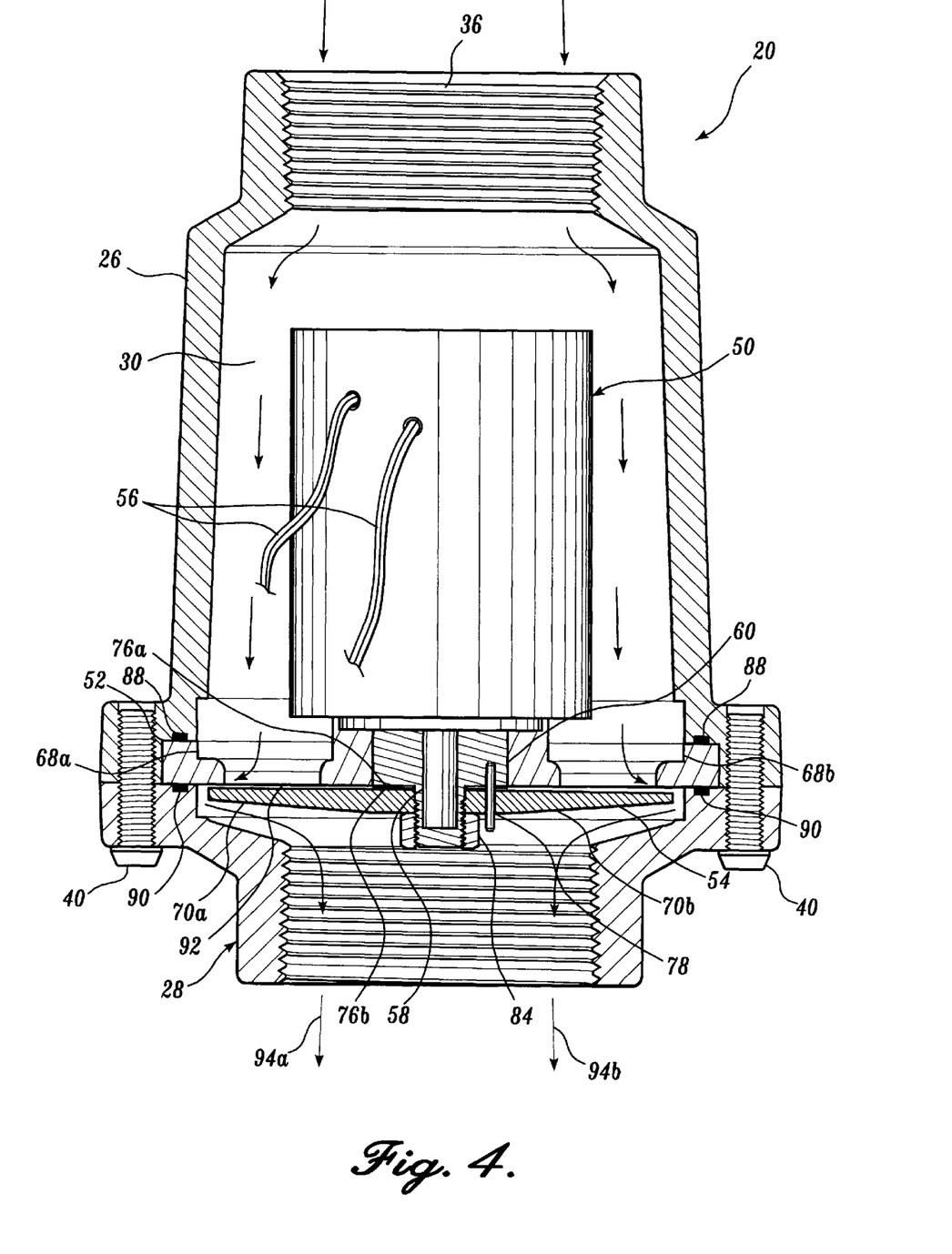
FIG. 4 is a cross-sectional view of a cyclic flow valve formed in accordance with the present invention shown in the low flow position.
Figure 5:
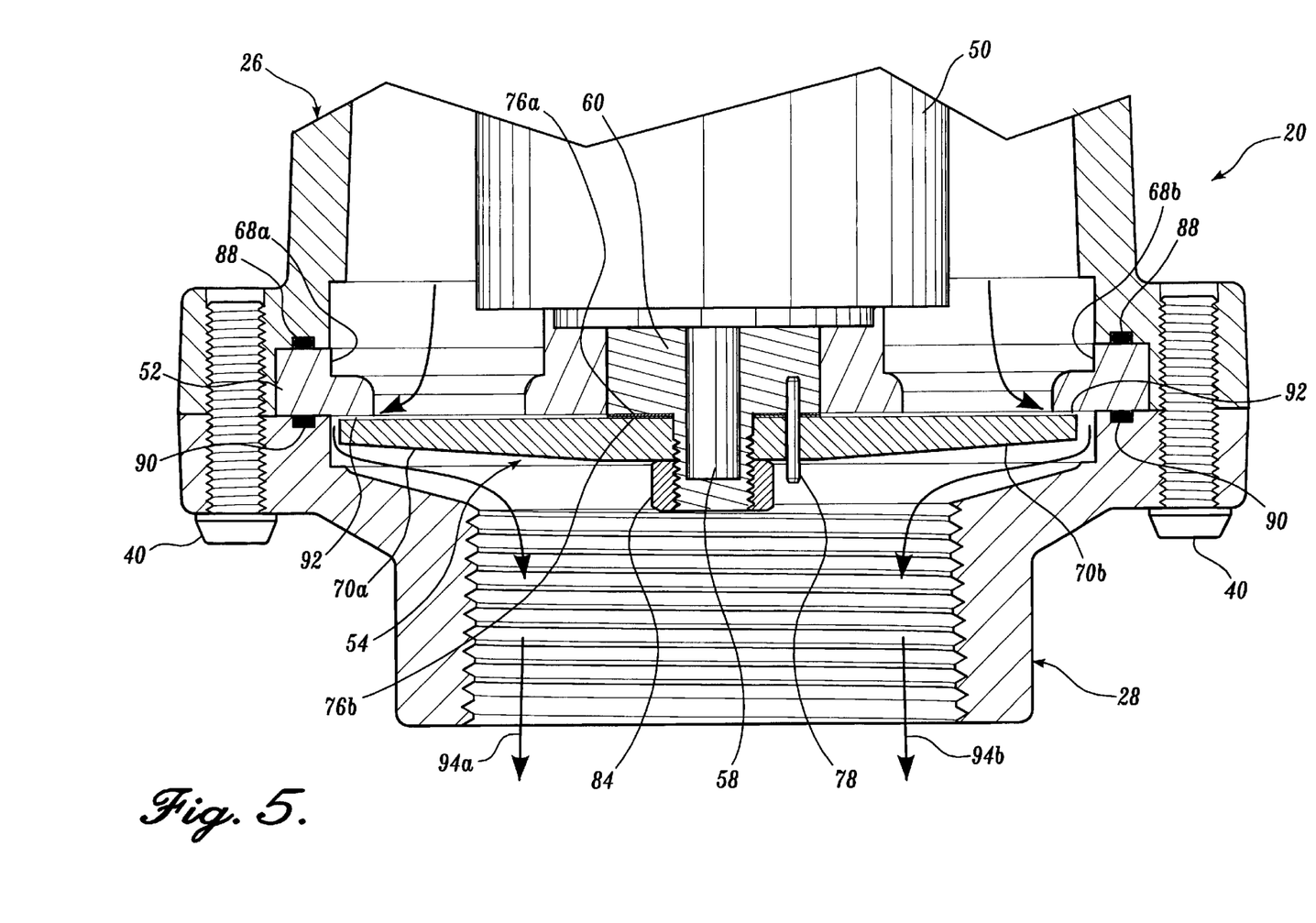
FIG. 5 is an enlarged partial cross-sectional view of a cyclic flow valve formed in accordance with the present invention showing a low flow gap between the aperture plate and rotor plate.

As may be seen better by referring to FIGS. 4 and 5, the first and second spacer washers 76a and 76b, which are disposed between the sleeve 60 and the rotor 54, space the rotor 54 from the aperture plate 52. This spacing defines a low flow gap 92 between the rotor 54 and the aperture plate 52. The low flow gap 92 lies between the adjacent surfaces of the aperture plate 52 and the rotor 54. Because the first and second spacer washers 76a and 76b prevent the rotor 54 from fitting flushly against the aperture plate 52, when the valve 20 is in the low flow position, illustrated in FIGS. 4 and 5, fuel is permitted to pass through the flow valve 20 at a predetermined low flow rate via the low flow gap 92. Although two washers are shown spacing the rotor 54 from the aperture plate 52, more or less washers may be disposed therebetween, thereby allowing the width of the low flow gap 92 to be adjusted. Thus, by changing the number of washers disposed between the aperture plate 52 and the rotor 54, the size of the low flow gap 92 may be increased or decreased to permit more or less flow to pass through the valve 20 in the low flow position. Changing the number of washers allows the low flow rate to be incrementally adjusted.

Figure 6:
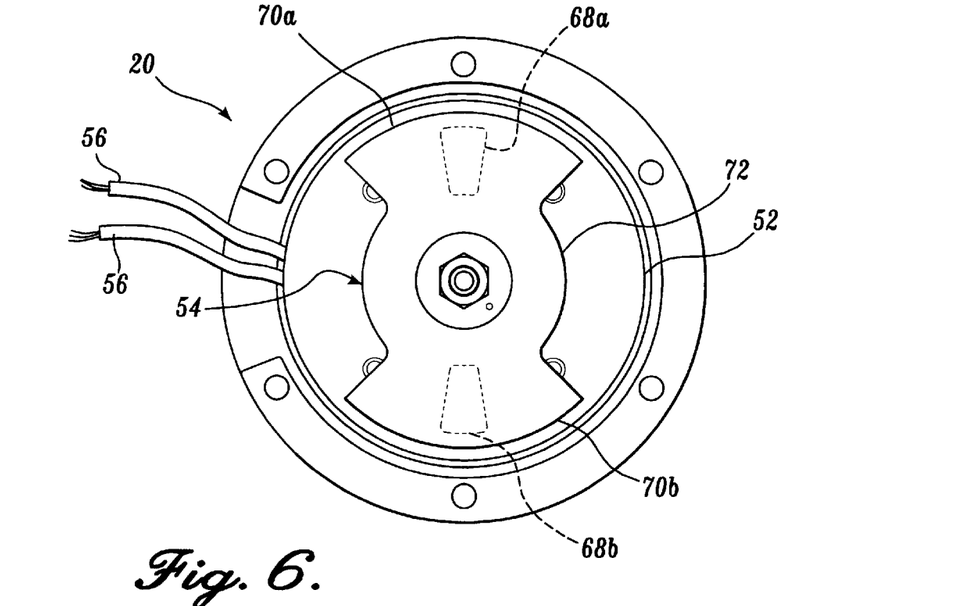
FIG. 6 is an end view of a cyclic flow valve formed in accordance with the present invention with the exit manifold removed for clarity and the flow valve shown in the low flow position.
Figure 7:
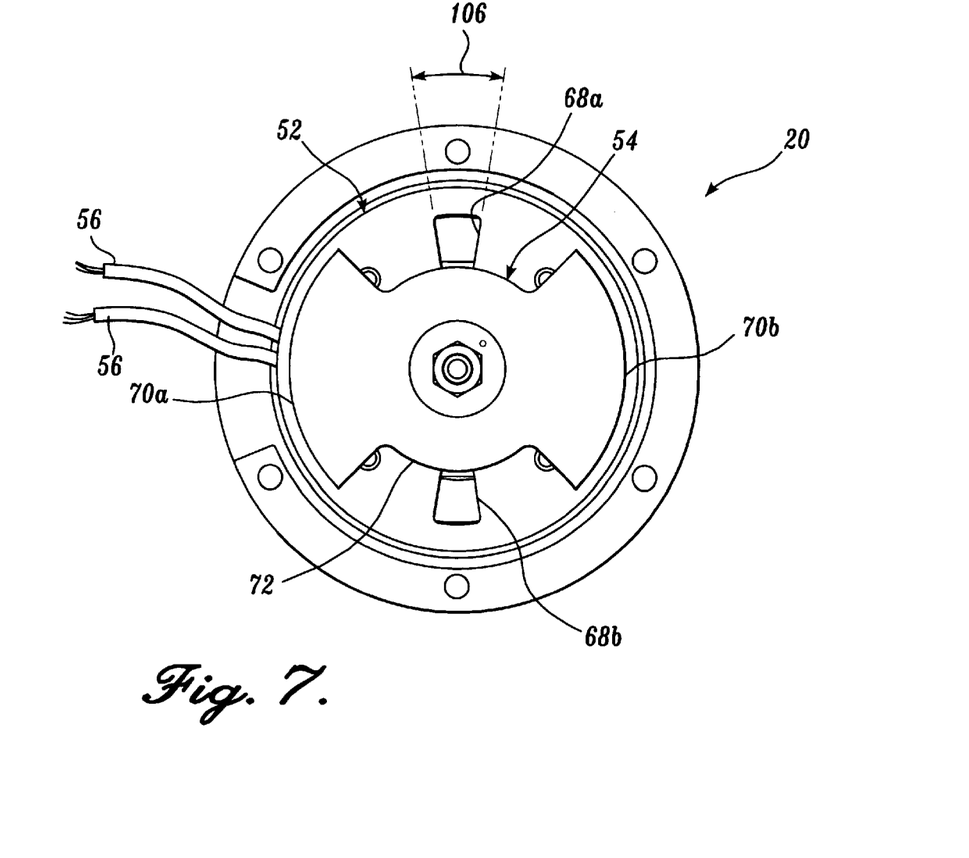
FIG. 7 is an end view of a cyclic flow valve formed in accordance with the present invention with the exit manifold removed for clarity and the flow valve shown in the high flow position.
Figure 8:
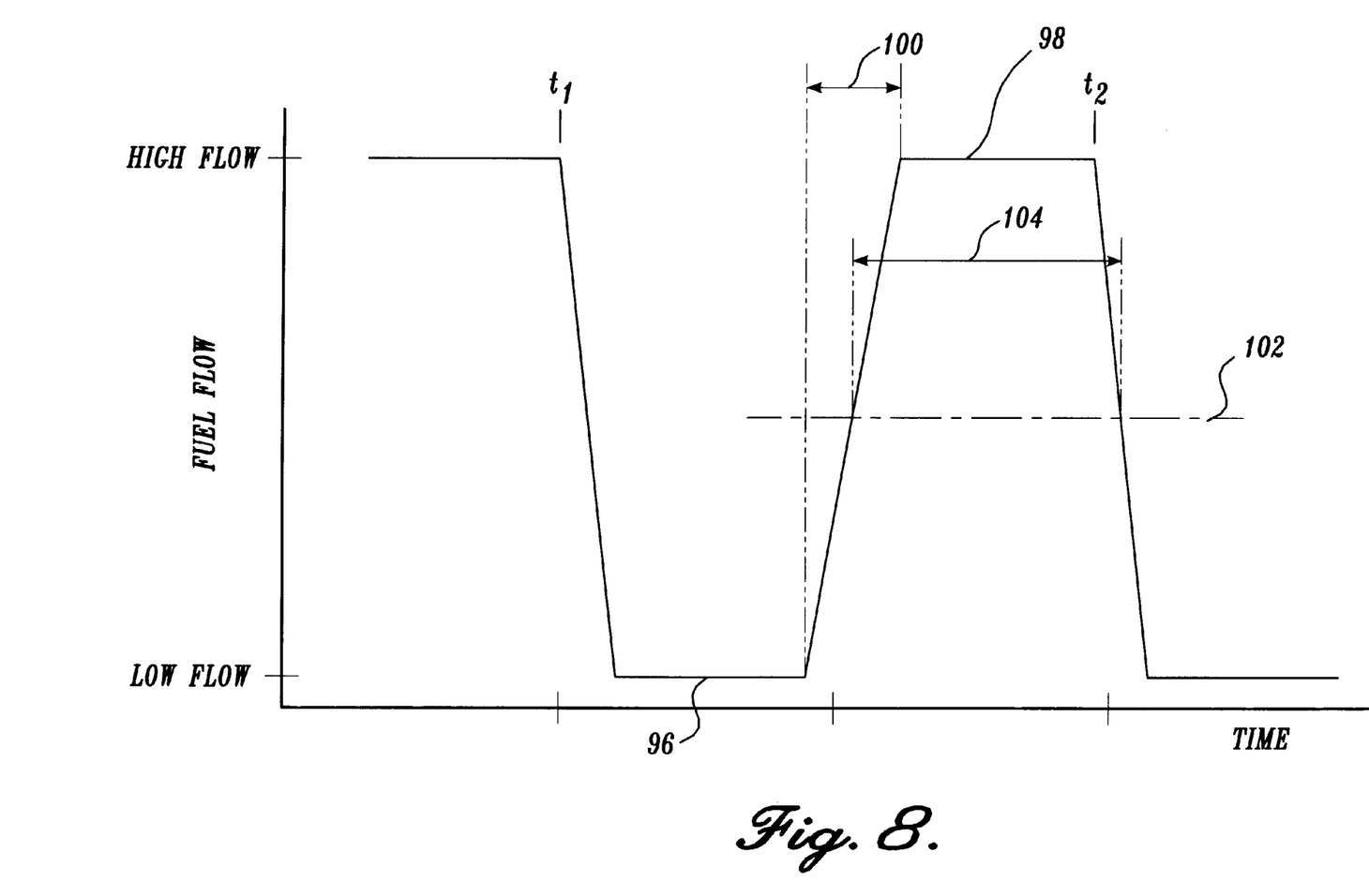
FIG. 8 is an exemplary graphic view of the oscillating square waveform of the mass flow rate through a cyclic flow valve formed in accordance with the present invention.

Operation of the valve 20 may be best understood by referring to FIGS. 6–8. For purposes of clarity in describing the present invention, FIGS. 6 and 7 are shown with the exit manifold 28 removed from the valve housing 26. In FIG. 6, the valve 20 is shown in the low flow position. When in this position, the first and second paddles 70a and 70b of the rotor 54 obstruct the flow of fuel through the first and second flow passages 68a and 68b of the aperture plate 52. Although the first and second paddles 70a and 70b obstruct the flow through the flow passages 68a and 68b, because of the low flow gap 92 (FIG. 5), fuel is still permitted to flow through the valve 20, but at a substantially reduced rate, as is graphically illustrated in FIG. 8 by the line 96. Thus, although the paddles 70a and 70b of the rotor 54 obstruct the flow through the valve 20, a predetermined minimum amount of flow is still permitted to pass therethrough.

The high flow position may be best understood by referring to FIG. 7. In the high flow position, the first and second paddles 70a and 70b are rotated by the motor 50 out of obstruction with the first and second flow passages 68a and 68b of the aperture plate 52. In the high flow position, fuel is permitted to flow through the first and second passages 68a and 68b unobstructed by the first and second paddles 70a and 70b. Thus, in the high flow position, fuel is permitted to flow through the valve 20 at a predetermined maximum flow rate, as is graphically illustrated in FIG. 8 by the line 98.

As is described in greater detail below, the transition time between the low flow and high flow positions may be selectively increased or decreased. Also, the pulse frequency and duty cycle may be adjusted to accommodate a variety of operating conditions. Thus, the flow through the cyclic flow valve 20 of the present invention may be selectively adjusted to optimize the flow therethrough for a variety of operating conditions.

Adjusting the transition time between the low flow rate 96 and high flow rate 98 may be best understood by referring to FIG. 8. The transition time from the low flow rate 96 to the high flow rate 98 is illustrated by the arrow 100. The transition time 100 between the high and low flow positions of the valve 20 may be selectively adjusted by increasing or decreasing the angular size 106 of the first and second flow passages 68a and 68b of the aperture plate 52. For a consistent speed of rotation of the rotor 54, increasing the angular size 106 of the flow passages 68a and 68b increases the transition time 100. Conversely, for a constant rotor speed, decreasing the angular size 106 of the flow passages 68a and 68b decreases the transition time 100.

Adjusting the high flow rate may be best understood by referring to FIGS. 6 and 7. For fixed size flow passages 68a and 68b, the highest possible high flow rate may be adjusted by sizing the diameter of the central circular section 72 of the rotor 54, such that the central section 72 does not obstruct any flow through the first and second flow passages 68a and 68b when the valve is in the high flow position, as illustrated in FIG. 7. Sizing the diameter of the central section 72 such that it does not interfere with the fuel flow through. the flow passages 68a and 68b maximizes the amount of fuel passing therethrough. Increasing the diameter of the central section 72 such that it obstructs at least a portion of the fuel flow through the passages 68a and 68b decreases the maximum flow rate. Thus, by sizing the diameter of the central portion 72 of the rotor plate, the high flow rate can be selectively adjusted.

Optimization of the pulse frequency, i.e., the frequency of the fuel flow through the valve 20, may be best understood by referring back to FIG. 8. The pulse frequency is increased or decreased by increasing or decreasing the velocity of the motor 50. The pulse period, defined as the difference between $t_2$ and $t_1$ of FIG. 8, is decreased by causing the motor 50 to rotate at a higher velocity, thereby decreasing the real time between $t_1$ and $t_2$ and, thus, increasing the pulse frequency. The pulse period is increased by causing the motor 50 to rotate at a slower velocity, thereby increasing the real time between $t_1$ and $t_2$ and, thus, decreasing the pulse frequency. Thus, the frequency of the pulses through the flow valve 20 may be optimized by selectively controlling the rotational speed of the motor 50 and, thus, the rotational speed of the rotor 54.

Selectively adjusting the duty cycle may be best understood by referring to FIG. 8. The duty cycle of the valve 20 is defined as the ratio of the amount of time the valve is flowing more than the average flow 102, to the pulse period of the valve, i.e., the difference between $t_2$ and $t_1$. That is, as seen in FIG. 8, the duty cycle is defined as the amount of time 104 the valve 20 is flowing more than its average flow 102, divided by the time difference between $t_2$ and $t_1$. The duty cycle may be adjusted according to the present invention, either mechanically or dynamically.

The duty cycle is mechanically adjusted by controlling the size of the surface area of the first and second paddles 70a and 70b of the rotor 54 during manufacture. A smaller paddle surface area allows the first and second flow passages 68a and 68b of the aperture plate 52 to remain in the full flow position for longer periods, thereby increasing the percentage of time the control valve 20 is in its high flow position per revolution of the rotor 54. Conversely, a large paddle surface area decreases the amount of time each flow passage 68a and 68b is unobstructed by the paddles 70a and 70b per revolution of the rotor 54, thereby decreasing the duty cycle of the control valve 20.

The duty cycle, the valve 20 is dynamically adjusted by using a stepper motor, rather than a DC motor and programming the stepper motor to selectively increase or decrease the duty cycle. This is accomplished by causing the stepper motor to slow its rotation while the first and second paddles 70a and 70b are in the high flow position and speed up during the period in which the paddles are in the low flow position. Because the amount of time the paddles 70a and 70b obstruct the mass flow rate through the first and second flow passages 68a and 68b decreases, the duty cycle increases. Conversely, reducing the speed of the motor when the paddles 70a and 70b are in the low flow position compared to when the paddles are in the high flow position, decreases the duty cycle.

The previously described version of the present invention provides several advantages over flow valves currently available in the art. First, because a mechanical rotor plate is not affected by the high temperatures of the combustion furnace, there is no corresponding deterioration due to the effects of heat. Therefore, a valve constructed in accordance with the present invention is cheaper and more reliable. Second, because the operator of the furnace may selectively increase or decrease the variable speed drive motor to optimize the pulse frequency of the combustants, a valve constructed in accordance with the present invention is more versatile than those currently available. A cyclic flow valve for combustion burners formed in accordance with the present invention is cheaper to manufacture and operate, is more reliable, and is more versatile than control valves currently available in the art.

From the foregoing description, it may be seen that a cyclic flow valve formed in accordance with the present invention incorporates many novel features and offers significant advantages over currently available control valves. While the presently preferred embodiment of the invention has been illustrated and described, it is to be understood that within the scope of the appended claims, various changes can be made therein without departing from the spirit of the invention.

The embodiments of the invention in which an exclusive property or privilege is claimed are defined as follows:

1. A cyclic flow valve suitable for cyclically controlling the flow of combustants into a pulse combustion burner, said cyclic flow valve comprising:
   (a) a valve housing having a chamber, an inlet, and an outlet;
   (b) a cyclic flow member disposed within the chamber to selectively cycle the flow of combustants therethrough between a low flow position, wherein the combustants flow between the inlet and outlet at a predetermined minimum flow rate, and a high flow position, wherein the combustants flow between the inlet and outlet at a predetermined maximum flow rate; and
   (c) a drive member for moving the cyclic flow member between the low flow position and the high flow position.

2. The cyclic flow valve of claim 1, wherein the cyclic flow member further comprises a rotary valve and wherein the drive member is a rotary drive member.

3. The cyclic flow valve of claim 2, wherein:
   (a) the rotary valve includes a stationary aperture plate and a rotor plate, the aperture plate including at least one aperture that extends through the aperture plate;
   (b) the rotor plate is positioned within the cyclic flow valve adjacent to the aperture plate; and
   (c) the rotor plate is rotated by the rotary drive member.

4. The cyclic flow valve of claim 3, wherein the rotor plate is spaced a predetermined distance from the aperture plate to define a flow gap therebetween.

5. The cyclic flow valve of claim 4, wherein the size of the flow gap controls the minimum flow rate of combustants through the cyclic flow valve when the cyclic flow valve is in the low flow position.

6. The cyclic flow valve of claim 5, wherein the shape of the rotor plate controls the maximum flow of combustants through the cyclic flow valve when the cyclic flow valve is in the high flow position.

7. The cyclic flow valve of claim 6, wherein the size of the at least one aperture controls the amount of time it takes to transition the cyclic flow valve between the low and high flow positions.

8. The cyclic flow valve of claim 3, wherein the shape of the rotor plate controls the maximum flow of combustants through the cyclic flow valve when the cyclic flow valve is in the high flow position.

9. The cyclic flow valve of claim 3, wherein the size of the at least one aperture controls the amount of time it takes to transition the cyclic flow valve between the low and high flow positions.

10. The cyclic flow valve of claim 3, wherein the aperture plate has first and second flow holes located along a common diameter that intersects the axis of rotation of the rotary drive member, on opposite sides of the axis of rotation.

11. The cyclic flow valve of claim 10, wherein the rotor plate has first and second paddles and a circular center section, the first and second paddles projecting radially outwardly from diametrically opposed edges of the center section, said paddles located such that when the rotor plate is rotated by the rotary drive member, the paddles alternate the cyclic flow valve between the low and high flow positions by simultaneously obstructing the first and second flow holes and then simultaneously unobstructing the flow holes.

12. The cycle flow valve of claim 11, wherein the size of the paddles controls the amount of time the cyclic flow valve is in the high flow position.

13. The cyclic flow valve of claim 12, wherein the rotor plate is spaced a predetermined distance from the aperture plate to define a flow gap therebetween.

14. The cyclic flow valve of claim 13, wherein the size of the flow gap controls the minimum flow rate of combustants through the cyclic flow valve when the cyclic flow valve is in the low flow position.

15. The cyclic flow valve of claim 12, wherein the size of the first and second flow holes controls the amount of time it takes to transition the cyclic flow valve between the low and high flow positions.

16. The cyclic flow valve of claim 2, wherein the rotary drive member is a variable speed motor.

17. The cyclic flow valve of claim 2, wherein controlling the speed of the rotary drive member controls the amount of time the cyclic flow valve is in the high flow position.

18. The cyclic flow valve of claim 17, wherein the rotary drive member is a stepper motor.

19. A cyclic flow valve suitable for cyclically controlling the flow of combustants into a pulse combustion apparatus, said cyclic flow valve comprising:
   (a) a valve housing having a chamber, an inlet, and an outlet;
   (b) an aperture plate rigidly fixed within the chamber of the valve housing, the aperture plate having at least one aperture extending through the aperture plate;
   (c) a rotor member rotatably secured within the chamber, the rotor member being held in spaced disposition from the aperture plate so as to define a low flow gap of predetermined width therebetween, the rotor member having at least one aperture closure paddle positioned and sized with respect to the at least one aperture in the aperture plate to selectively control the flow of combustants through the flow valve between a low flow position, wherein the combustants are forced to flow through the low flow gap, and a high flow position, wherein the combustants are not forced to flow through the low flow gap; and
   (d) a rotary drive member for rotating the rotor member between the low flow position and the high flow position.

20. The cyclic flow valve of claim 19, wherein the space between the rotor member and the aperture plate defines a flow gap therebetween.

21. The cyclic flow valve of claim 20, wherein the size of the flow gap controls the flow rate of combustants through the cyclic flow valve when the cyclic flow valve is in the low flow position.

22. The cyclic flow valve of claim 21, wherein the size of the at least one aperture in the aperture plate controls the amount of time it takes to transition the cyclic flow valve between the high and low flow positions.

23. The cyclic flow valve of claim 22, wherein the rotary drive member is a variable speed motor, wherein controlling the speed of the rotary drive member controls the amount of time the cyclic flow valve is in the high flow position.

24. The cyclic flow valve of claim 23, wherein the aperture plate includes first and second apertures and wherein the rotor member has first and second paddles projecting radially from diametrically opposite edges thereof, the first and second apertures and the first and second paddles are positioned and sized such that as the rotor member is rotated by the rotary drive member, the paddles alternate the cyclic flow valve between the low and high flow positions by simultaneously obstructing the first and second apertures and then simultaneously unobstructing the first and second apertures of the aperture plate.

25. The cyclic flow valve of claim 19, wherein the size of the at least one aperture in the aperture plate controls the amount of time it takes to transition the cyclic flow valve between the high and low flow positions.

26. The cyclic flow valve of claim 19, wherein the rotary drive member is a variable speed motor, wherein controlling the speed of the rotary drive member controls the amount of time the cyclic flow valve is in the high flow position.

27. The cyclic flow valve of claim 19, wherein the aperture plate includes first and second apertures and wherein the rotor member has first and second paddles projecting radially from diametrically opposite edges thereof, the first and second apertures and the first and second paddles are positioned and sized such that as the rotor member is rotated by the rotary drive member, the paddles alternate the cyclic flow valve between the low and high flow positions by simultaneously obstructing the first and second apertures and then simultaneously unobstructing the first and second apertures of the aperture plate.

* * * * *